United States Patent
Kotaki

[11] Patent Number: 5,907,355
[45] Date of Patent: May 25, 1999

[54] SOLID STATE COLOR IMAGE PICKUP APPARATUS

[75] Inventor: Hiroaki Kotaki, Yokohama, Japan

[73] Assignee: Kabushiki Kaisha Toshiba, Kawasaki, Japan

[21] Appl. No.: 08/711,155

[22] Filed: Sep. 10, 1996

[30] Foreign Application Priority Data

Sep. 28, 1995 [JP] Japan .................................. 7-250551

[51] Int. Cl.$^6$ .................................................. H04N 5/335
[52] U.S. Cl. ........................ 348/273; 348/493; 348/279; 348/505
[58] Field of Search ..................................... 348/488, 493, 348/505, 237, 234, 279, 273, 713, 708; H04N 5/335

[56] References Cited

U.S. PATENT DOCUMENTS

| | | | |
|---|---|---|---|
| 4,758,883 | 7/1988 | Kawahara et al. | 358/44 |
| 4,903,122 | 2/1990 | Ozaki et al. | 358/48 |
| 5,121,193 | 6/1992 | Nishimura et al. | 358/44 |
| 5,243,412 | 9/1993 | Goukura et al. | 358/19 |
| 5,278,637 | 1/1994 | Naimpally | 358/12 |

*Primary Examiner*—Wendy Garber
*Assistant Examiner*—Jacqueline Wilson
*Attorney, Agent, or Firm*—Pillsbury Madison & Sutro LLP

[57] ABSTRACT

A solid state color image pickup apparatus easily converts an output from a solid state image sensor to a television signal with a simple structure, thereby facilitating the reduction of the size, weight, power consumption and cost of the image pickup apparatus. A color filter, which has a plurality of color filter elements respectively facing light receiving elements of a solid state image sensor, modulates optical information so that an image pickup signal output from the solid state image sensor is composed of a luminance signal component and modulated color signal components, which are obtained by modulating, with two color-difference signals, two carrier waves having phases different from each other by $\pi/2$, the phases of the two carrier waves are different by $\pi$ every horizontal scanning period in each field of a television signal, and the luminance signal component has a spectral characteristic substantially the same as that of a luminance signal of a standard television system, the first color-difference signal has a spectral characteristic substantially the same as that of a signal obtained by subtracting the luminance signal of the standard television system from a red signal of the standard television system, and the second color-difference signal has a spectral characteristic substantially the same as that of a signal obtained by subtracting the luminance signal of the standard television system from a blue signal of the standard television system.

4 Claims, 4 Drawing Sheets

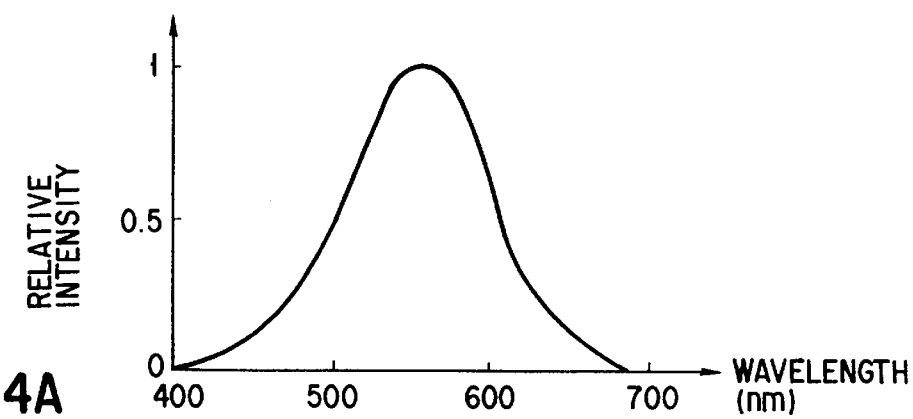
F I G. 4A
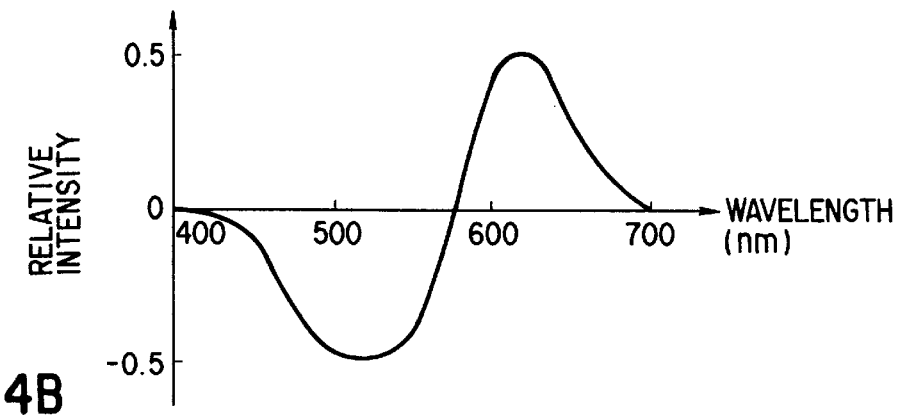
F I G. 4B
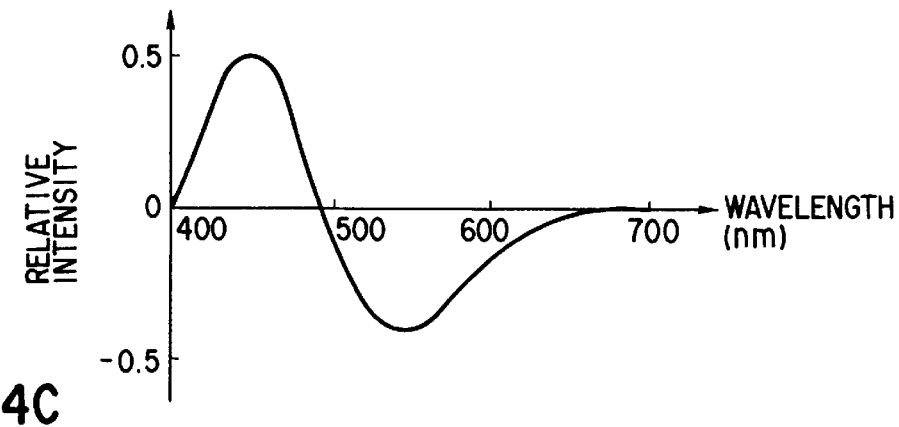
F I G. 4C

SOLID STATE COLOR IMAGE PICKUP APPARATUS

BACKGROUND OF THE INVENTION

1. Field of the Invention

The present invention relates to a solid state color image pickup apparatus using a solid state image sensor, such as a CCD (Charge Coupled Device).

2. Description of the Related Art

A so-called single chip color camera is well known, which obtains a color image signal by means of only one CCD image sensor. Since the single chip color camera, which is compact and light, is easy to handle and economically advantageous, it is utilized in image information input devices in various fields. The single chip color camera comprises optical color filters for light receiving elements on the CCD image sensor to separate color information from one another.

In the single chip color camera, conventional image signal processing means have the following structure. An optical image focused by an image pickup lens is imaged on an image pickup surface of the CCD image sensor through color filters. The CCD image sensor outputs an image signal corresponding to the optical image. The image pickup signal is amplified to a predetermined level by an amplifier. The amplified signal is converted to a digital signal by an A/D (analog/digital) converter.

The digital video signal output from the A/D converter is directly supplied to a color separator, and also 1H delayed by a 1H (horizontal scanning period) delay line and thereafter supplied to the color separator. The color separator performs a matrix process for Mg, G, Cy and Ye signals corresponding to the color elements of the color filters, thereby generating three primary color signals, G, B and R signals.

The three primary color signals are subjected to processes in a television camera, such as a white balance process and a gamma control. The three primary color signals are further subjected to a matrix process, and converted to a luminance signal Y and two color-difference signals $(R-Y_L)$ and $(B-Y_L)$. $Y_L$ is a low-pass component of the luminance signal Y. The two color-difference signals $(R-Y_L)$ and $(B-Y_L)$ are respectively supplied to the corresponding modulators.

A sub-carrier signal of 3.579545 MHz is phase-shifted by a phase shifter and supplied to the $(R-Y_L)$ modulator. Further, a sub-carrier signal of 3.579545 MHz is directly supplied to the $(B-Y_L)$ modulator. Therefore, the phase-shifted sub-carrier signal is modulated with the color-difference signal $(R-Y_L)$ by the $(R-Y_L)$ modulator and the sub-carrier signal is modulated with the color difference signal $(B-Y_L)$ by the $(B-Y_L)$ modulator.

Output signals from the $(R-Y_L)$ and $(B-Y_L)$ modulators are added together by an adder, and thereafter converted to an analog signal by a D/A (digital to analog) converter, so that a modulated color signal $C_A$ is generated. The aforementioned luminance signal Y is also supplied to the D/A converter and converted to an analog luminance signal $Y_A$.

The modulated color signal $C_A$ and the luminance signal $Y_A$ are added to a color burst signal and a sync signal by another adder. As a result, a television signal of NTSC (National Television System Committee), one of the standard television systems, is generated.

As described above, to convert a video signal output from the CCD image sensor to a television signal of the NTSC system, the conventional video signal processing means perform a series of signal processes, in which the video signal is subjected to a color separating process to obtain three primary color G, B and R signals; the G, B and R signals are subjected to a process/matrix process to obtain a luminance signal Y and two color-difference signals $(R-Y_L)$ and $(B-Y_L)$; and the sub-carrier signal of 3.579545 MHz is subjected to quadrature modulation with the color-difference signals $(R-Y_L)$ and $(B-Y_L)$ to obtain a modulated color signal $C_A$.

To execute the above series of signal processes, circuit blocks are inevitably required. For this reason, although the color camera uses a CCD image-pickup element, which is compact, light, low-power consuming and inexpensive, there is a problem that the size, weight, power consumption and cost of the camera itself cannot be sufficiently reduced.

Even if most of the signal processing circuit blocks are integrated as an IC to improve the integration density, the above problem cannot be practically solved, since the reduction of the size and weight, power consumption and cost of a camera is limited to a certain degree. The above problem is posed whether the signal processing in the camera is analog or digital, because the circuit blocks are required to perform the above series of signal processes in either case.

As described above, in the conventional video signal processing means in a color camera having a CCD image sensor, to convert a video signal output from the CCD image sensor to a television signal of the standard system, complicated signal processes are required. The conventional art therefore has a problem in that the reduction of the size, weight, power consumption and cost of the camera itself is limited.

SUMMARY OF THE INVENTION

The present invention has been made to solve the above problem. It is accordingly an object of the present invention to provide an improved solid state color image pickup apparatus which can easily convert a video signal output from a solid state image sensor to a television signal with a simple structure, thereby facilitating the reduction of the size, weight, power consumption and cost of the image pickup apparatus.

To achieve the above object, the solid state color image pickup apparatus of the present invention comprises:

a solid state image sensor having a plurality of light receiving elements arranged in rows and columns and respectively constituting pixels; and a color filter having a plurality of color filter elements respectively corresponding to the light receiving elements of the solid state image sensor and arranged such that color separating characteristics are repeated according to a predetermined rule, when image pickup signals picked up by the light receiving elements are read from the solid state image sensor at a horizontal frequency, the color elements being arranged so that the color filter modulates optical information as follows:

the image pickup signal is composed of a luminance signal component and modulated color signal components, which are obtained by modulating, with first and second color-difference signals, two carrier waves having phases different from each other by $\pi/2$;

the phases of the two carrier waves are different by $\pi$ every horizontal scanning period in each field of a television signal;

the phases of the two carrier waves are reset every frame of a television signal; and the luminance signal component has a spectral characteristic substantially the same as that of a luminance signal of a standard television system, the first color-difference signal has a spectral characteristic substantially the same as that of a signal obtained by subtracting the luminance signal of the standard television system from a red signal of the standard television system, and the second color-difference signal has a spectral characteristic substantially the same as that of a signal obtained by subtracting the luminance signal of the standard television system from a blue signal of the standard television system.

With the above structure, complicated signal processes as in the conventional art are not required, and a video signal output from a solid state image sensor can easily be converted to a television signal with a simple structure, thereby greatly facilitating the reduction of the size, weight, power consumption and cost of the image pickup apparatus.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4A is a diagram showing a spectral characteristic of a luminance signal component contained in an output signal from the CCD image sensor having the color filter elements shown in FIG. 2;

FIG. 4B is a diagram showing a spectral characteristic of a first color-difference signal contained in an output signal from the CCD image sensor having the color filter elements shown in FIG. 2;

FIG. 4C is a diagram showing a spectral characteristic of a second color-difference signal contained in an output signal from the CCD image sensor having the color filter elements shown in FIG. 2;

DETAILED DESCRIPTION OF THE PREFERRED EMBODIMENTS

Embodiments of the present invention will be described with reference to the accompanying drawings.

Figure 1:
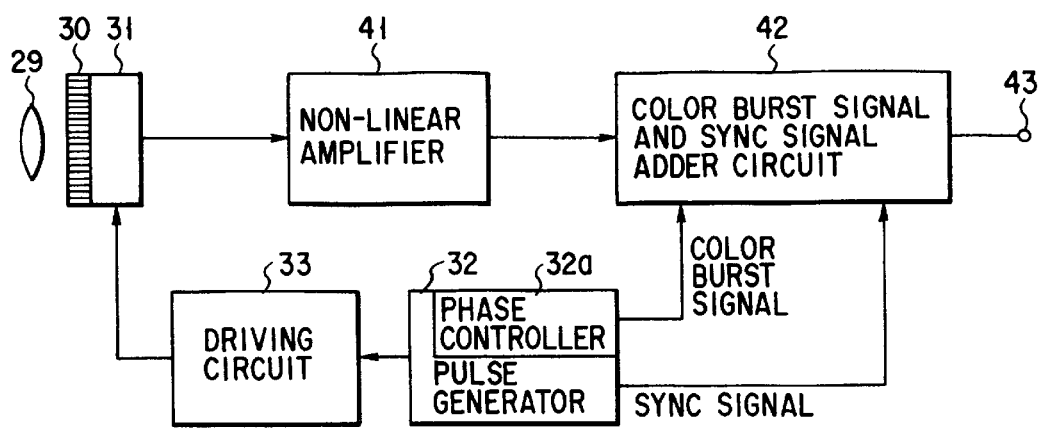
FIG. 1 is a block diagram showing a solid state color image pickup apparatus according to an embodiment of the present invention.

Referring to FIG. 1, optical information focused by an image pickup lens 29 is imaged on a solid state image sensor, such as CCD image sensor 31 using a CCD, through a color filter 30. The CCD image sensor 31 is driven by a driving circuit 33, which operates in accordance with pulses output from a pulse generator 32.

Figure 2:
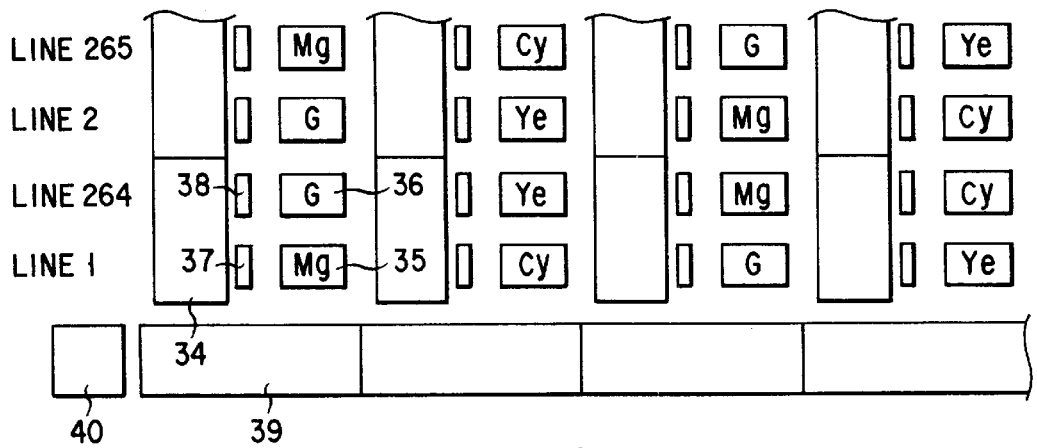
FIG. 2 is a diagram for explaining a structure of a CCD image sensor and an arrangement of color filter elements according to the embodiment shown in FIG. 1.

FIG. 2 shows a structure of part of the CCD image sensor 31 and an arrangement of the color filter 30. The CCD image sensor 31 has, for example, about 500 pixels in the vertical direction and about 800 pixels in the horizontal direction. It is assumed that a pixel includes a light receiving element. For interlaced scanning of a television signal, two light receiving elements 35 and 36 correspond to one vertical transfer CCD 34. A signal charge stored in the light receiving element 35 is transmitted to the vertical transfer CCD 34 through a reading gate 37 in a vertical blanking period.

A signal charge stored in the light receiving element 36 is also transmitted to the vertical transfer CCD 34 through a reading gate 38 in a vertical blanking period. In this case, signal charges in lines 1, 2, ... shown in FIG. 2 are read in a first field in a first frame, whereas signal charges in lines 264, 265, ... are read in a second field.

Signal charges transferred to the vertical transfer CCD 34 are successively transferred in the vertical direction in a horizontal blanking period. A signal charge transferred to the last stage of the vertical transfer CCD 34 is transferred to a horizontal transfer CCD 39 in units of line in a horizontal blanking period. The horizontal transfer CCD 39 is driven at the frequency of 14.31818 MHz, which is four times the frequency of a sub-carrier signal of the NTSC system. As a result, a signal charge (i.e. an image pickup signal) output from the horizontal transfer CCD 39 is externally output through an output portion 40.

In the color filter 30, as shown in FIG. 2, filter elements are arranged in units of four rows and four columns. More specifically, in the lines 1 and 265, Mg color filter elements, Cy color filter elements, G color filter elements and Ye color filter elements are repeatedly arranged in the horizontal direction in units of four pixels. In the lines 264 and 2, the phase of repetition is shifted by $\pi$; that is, G color filter elements, Ye color filter elements, Mg color filter elements and Cy color filter elements are repeatedly arranged in the horizontal direction in units of four pixels.

The above arrangement means that the color filter elements having the different color separating characteristics are repeatedly arranged in accordance with a predetermined rule.

In a case where the color elements are arranged in accordance with the aforementioned rule, when an image pickup signal picked up by the light receiving element is read in the horizontal frequency of 14.31818 MHz, the color filter can modulate optical information in the following manner.

The color filter optically modulates optical information so that an image pickup signal is composed of a luminance signal component and two modulated color signal components, which are obtained by modulating, with two color-difference signals, two carrier waves having phases different from each other by $\pi/2$. It also modulates optical information so that the phases of the two carrier waves are different by $\pi$ every horizontal scanning period in each field of a television signal. Furthermore, it modulates optical information so that the phases of the two carrier waves are reset every frame of a television signal. It modulates optical information so that the spectral characteristic of the luminance signal component is substantially the same as that of the luminance signal of the standard television system, the spectral characteristic of a first color-difference signal of the two color-difference signals is substantially the same as that of a signal obtained by subtracting the luminance signal of the standard television system from a red signal of the standard television system, and the spectral characteristic of a second color-difference signal of the two color-difference signals is substantially the same as that of a signal obtained by subtracting the luminance signal of the standard television system from a blue signal of the standard television system.

Referring back to FIG. 1, an image pickup signal output from the CCD image sensor 31 is supplied to a non-linear amplifier 41. The amplifier 41 amplifies the signal to a predetermined level and subjects it to a gamma control process in accordance with the level of the image pickup signal input thereto. An output signal from the non-linear amplifier 41 is supplied to a color burst signal and sync signal adder circuit 42. The circuit 42 adds a color burst signal and a sync signal, which are phase-controlled and output from the pulse generator 32, to the signal supplied from the non-linear amplifier 41, and finally converts the addition signal to a television signal. The television signal is output through an output terminal 43.

The color burst signal is subjected to a phase-control, characteristic to the present invention, by a phase controller 32a. The phase control will be described later.

An operation of the above embodiment will now be described in detail.

In general, an image pickup signal output from the CCD image sensor 31 attached to the color filter 30 can be expressed as follows. First, an output signal V1(t) is obtained from the lines 1, 265, . . . in which the Mg, Cy, G and Ye filter elements are repeatedly arranged in this order in the color filter 30.

$$V1(t) = (1/4)(V_{Mg} + V_{Cy} + V_G + V_{Ye}) + \quad (1)$$

$$(1/\pi)\{(V_{Mg} - V_{Cy} - V_G + V_{Ye})\cos\omega_S t +$$

$$(V_{Mg} + V_{Cy} - V_G - V_{Ye})\sin\omega_S t\}$$

In this equation, $V_{Mg}$, $V_{Cy}$, $V_G$ and $V_{Ye}$ respectively represent the levels of image pickup output signals generated, when the color filter elements respectively occupy light receiving elements.

An output signal V2(t) is obtained from the lines 264, 2, . . . in which the G, Ye, Mg and Cy filter elements are repeatedly arranged in this order in the color filter 30.

$$V2(t) = (1/4)(V_{Mg} + V_{Cy} + V_G + V_{Ye}) - \quad (2)$$

$$(1/\pi)\{(V_{Mg} - V_{Cy} - V_G + V_{Ye})\cos\omega_S t +$$

$$(V_{Mg} + V_{Cy} - V_G - V_{Ye})\sin\omega_S t\}$$

In the above equations (1) and (2), ω represents a space modulation angle frequency. When the transfer frequency of the horizontal transfer CCD 39 is 14.31818 MHz, $\omega_S/(2\pi)$ is 3.579545 MHz, which is the same as the frequency of the sub-carrier of the NTSC system. Only a fundamental wave component of the modulation components of $\omega_S$ is used, and a harmonic component is disregarded.

Figure 3:
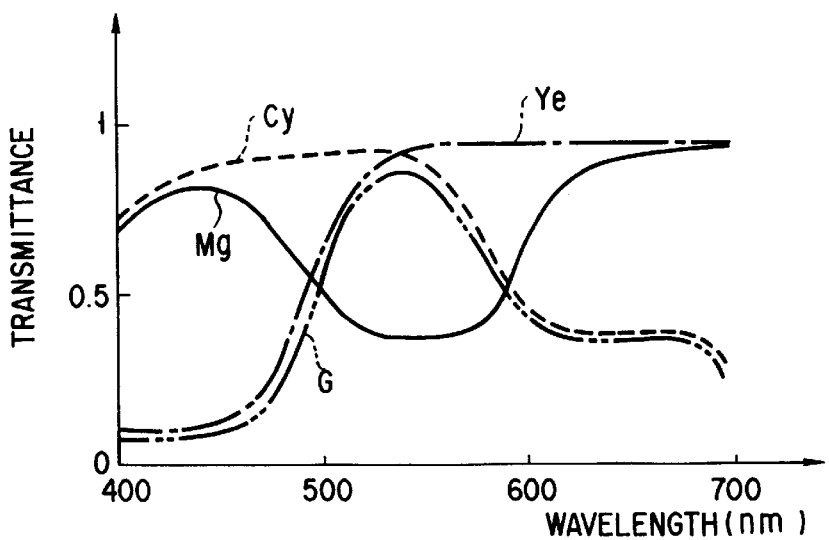
FIG. 3 is a diagram showing spectral characteristics of pixels of the CCD image sensor having the color filter elements shown in FIG. 2.

FIG. 3 shows spectral characteristics of Mg, Cy, G and Ye pixels. The spectral characteristics are determined by two conditions. The first condition is that the following equations (3) are satisfied when an object has an achromatic color under light of a reference color temperature.

$$V_{Mg}=V_G \text{ and } V_{Cy}=V_{Ye} \quad (3)$$

The equations (3) mean that the modulation components of the equations (1) and (2) are substantially 0, when an object has an achromatic color under light of a reference color temperature.

The second condition is as follows: the term ($V_{Mg}+V_{Cy}+V_G+V_{Ye}$) of the unmodulated signal component is substantially the same as the luminance signal Y of the NTSC system in spectral characteristic; the first term ($V_{Mg}-V_{Cy}-V_G+V_{Ye}$) of the modulated component is substantially the same as a color-difference signal (R-Y) of the NTSC system in spectral characteristic; and the second term ($V_{Mg}+V_{Cy}-V_G-V_{Ye}$) of the modulated component is substantially the same as a color difference signal (B-Y) of the NTSC system in spectral characteristic.

Actually, when the spectral characteristics of the Mg, Cy, G and Ye pixels are set as shown in FIG. 3, the spectral characteristics of the unmodulated signal component ($V_{Mg}+V_{Cy}+V_G+V_{Ye}$) shown in FIG. 4A and the modulated signal components ($V_{Mg}-V_{Cy}-V_G+V_{Ye}$) and ($V_{Mg}+V_{Cy}-V_G-V_{Ye}$) shown in FIGS. 4B and 4C are respectively very close to the ideal spectral characteristics of the luminance signal Y and the color difference signals (R-Y) and (B-Y) of the NTSC system.

Under these conditions, the equations (1) and (2) are respectively rearranged as the following equations (4) and (5).

$$V1(t)=k_y Y+k_c\{(R-Y)\cos \omega_S t+(B-Y)\sin \omega_S t\} \quad (4)$$

$$V2(t)=k_y Y-k_c\{(R-Y)\cos \omega_S t+(B-Y)\sin \omega_S t\} \quad (5)$$

where $k_y$ and $k_c$ are constants.

As understood from the equations (4) and (5), an image pickup signal output from the CCD image sensor 31 is a multiple signal composed of a carrier color signal component and a luminance signal component, which are obtained by quadrature-modulating carrier waves, having a frequency of 3.579545 MHz and having phases different by π/2 from each other, with two color-difference signals (R-Y) and (B-Y). The phases of the carrier waves are inverted every horizontal scanning period, and reset to a horizontal reference phase every frame.

Figure 5A:
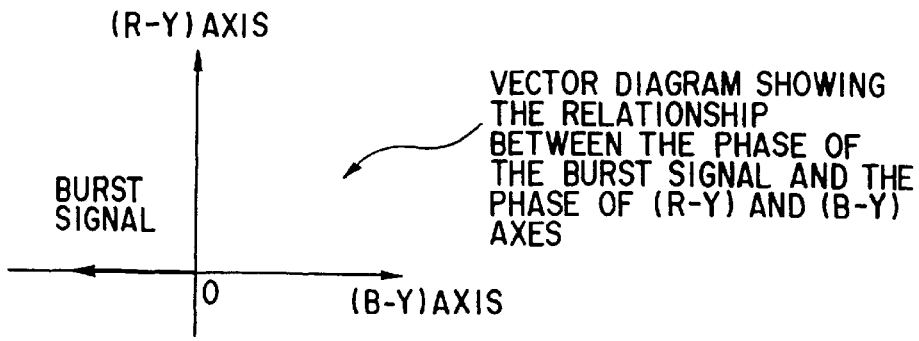
FIG. 5A is a diagram showing the relationship between the phase of a burst signal and the reference phase of each of the color-difference signals in the NTSC system.
Figure 5B:
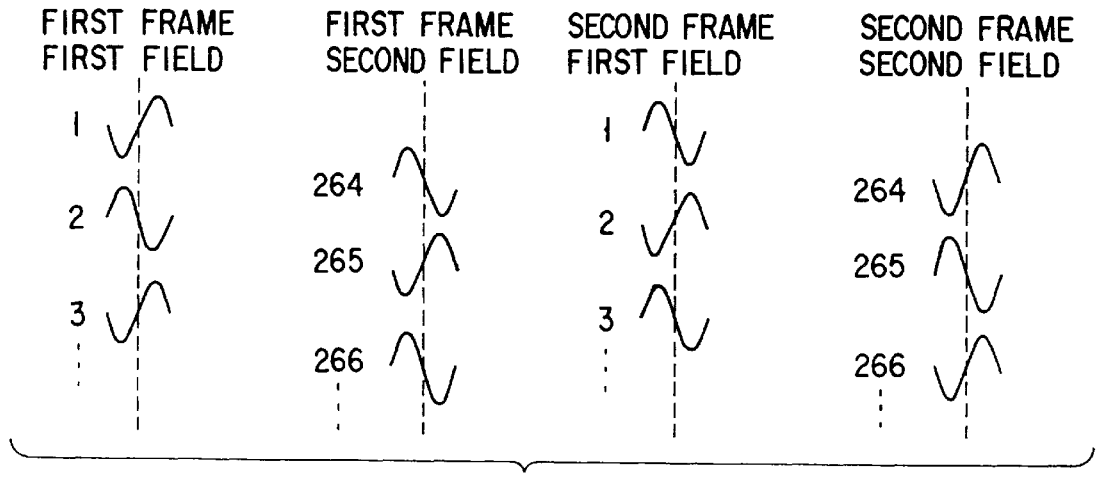
FIG. 5B is a diagram for explaining the phase relationship between lines and between fields of a sub-carrier wave in the NTSC system.

FIG. 5A shows the relationship between the phase of the burst signal and the reference phases of carrier waves (sub-carrier waves) of the color-difference signals according to the NTSC system. FIG. 5B shows the relationship between the reference phase of the horizontal scanning of a television signal and the reference phase of a carrier wave of a color signal. As shown in FIG. 5B, the reference phase of a carrier wave of a color signal is reset every two frames to the reference phase of the horizontal scanning.

Figure 5C:
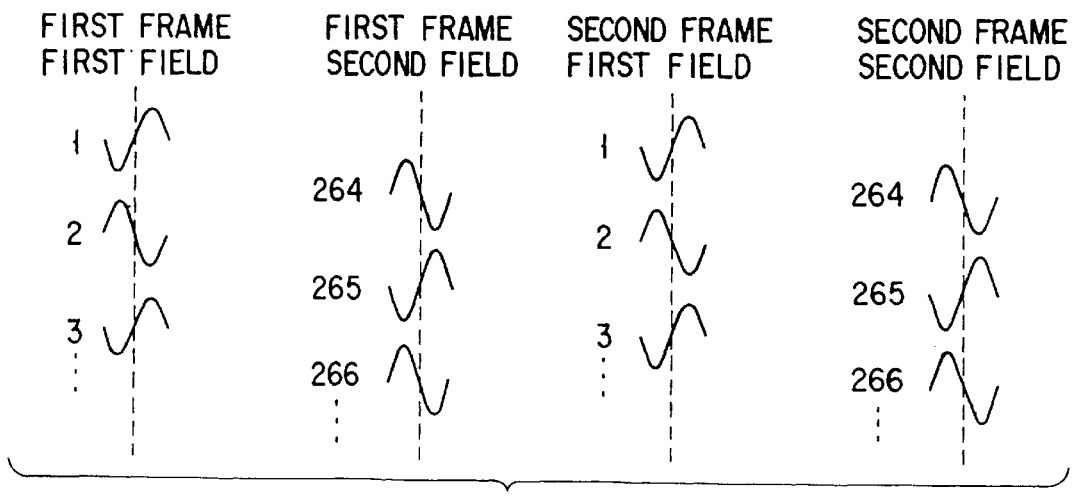
FIG. 5C is a diagram for explaining the phase relationship between lines and between fields of a sub-carrier wave of a signal output from the apparatus of the present invention.

According to the present invention, as shown in FIG. 5C, the reference phase of a carrier wave of a color signal is reset every frame. The present invention is different from the prior art in this respect.

A color lock mechanism using a PLL (Phase Locked Loop) circuit of the conventional television receiver can pull in the reference phase of the carrier wave in several horizontal scanning periods. Therefore, the phase reset of a color sub-carrier every frame is executed in a vertical blanking period. Thus, a signal output from the output terminal can be displayed as a color image on the receiver.

For the reason stated above, in the present invention, the phase of a color burst signal must be reset every frame. Referring back to FIG. 1 again, the phase controller 32a is included in the pulse generator 32 to generate such a color burst signal.

As described above, the apparatus of the above embodiment comprises the CCD image sensor 31 having pixels arranged two dimensionally and the color filter 30 having color filter elements respectively facing the light receiving elements of the CCD image sensor 31.

The filter 30 optically modulates optical information so that an image pickup signal output from the CCD image sensor 31 is composed of a luminance signal component $Y_A$, and a modulated color signal component $C_A$, which is obtained by quadrature-modulating carrier waves, having phases different by $\pi/2$ from each other, with two color-difference signals (R-Y) and (B-Y).

The color filter 30 modulates optical information so that the phases of the two carrier waves are different by $\pi$ every horizontal scanning period in each field of a television signal. Furthermore, it modulates optical information so that the spectral characteristic of the luminance signal component contained in the image pickup signal output from the CCD image sensor 31 is substantially the same as that of the luminance signal of the standard television system, the spectral characteristic of a first color-difference signal of the two color-difference signals contained in the image pickup signal is substantially the same as that of a signal obtained by subtracting the luminance signal of the standard television system from a red signal of the standard television system, and the spectral characteristic of a second color-difference signal of the two color-difference signals is substantially the same as that of a signal obtained by subtracting the luminance signal of the standard television system from a blue signal of the standard television system.

It follows from the above matter that an image pickup signal output from the CCD image sensor 31 is substantially the same as the signal form of one of the standard television systems, the NTSC system. In other words, it is possible to eliminate substantially all the circuit blocks, which are necessarily required for the conventional video signal processing means. Therefore, an output from the CCD image sensor 31 can be converted to a form of the standard television signals. Consequently, the size, weight, power consumption and cost of the image pickup apparatus can be efficiently reduced.

Moreover, in the above embodiment, since the spectral characteristics of the pixels of the CCD image sensor 31 having the color filter 30 are determined as shown in FIG. 3, the two color-difference signals (R-Y) and (B-Y) are 0, when an object of an achromatic color is photographed under light of a reference color temperature and a modulated color signal is not generated. Hence, if achromatic color light of any luminance is incident on the image pickup apparatus in vertical direction, the color-difference signal is always 0, so that generation of a vertical aliasing can be prevented.

Moreover, so far as the luminance signal is concerned, the case of photographing an object of an achromatic color, in which no modulated color signal is generated, is equivalent to the case of using no color filter 30, i.e., the case of using a monochrome CCD image sensor. Therefore, color aliasing due to a modulated color signal is prevented, and the performance of a luminance signal can be increased to the limit of the characteristic of the monochrome CCD image sensor. In addition, an image lag, smear or blooming artifact is colored very little.

According to the above description referring to FIG. 1, the non-linear amplifier 41 executes gamma control in accordance with an input level. The operation of the non-linear amplifier 41 is mainly to correct the gamma characteristic of a television receiver using a CRT (Cathode Ray Tube). If the gamma characteristic of another type of display device, e.g., a liquid crystal display device, is different from that of the CRT, gamma control on the side of the image pickup apparatus may not be required.

Figure 6:
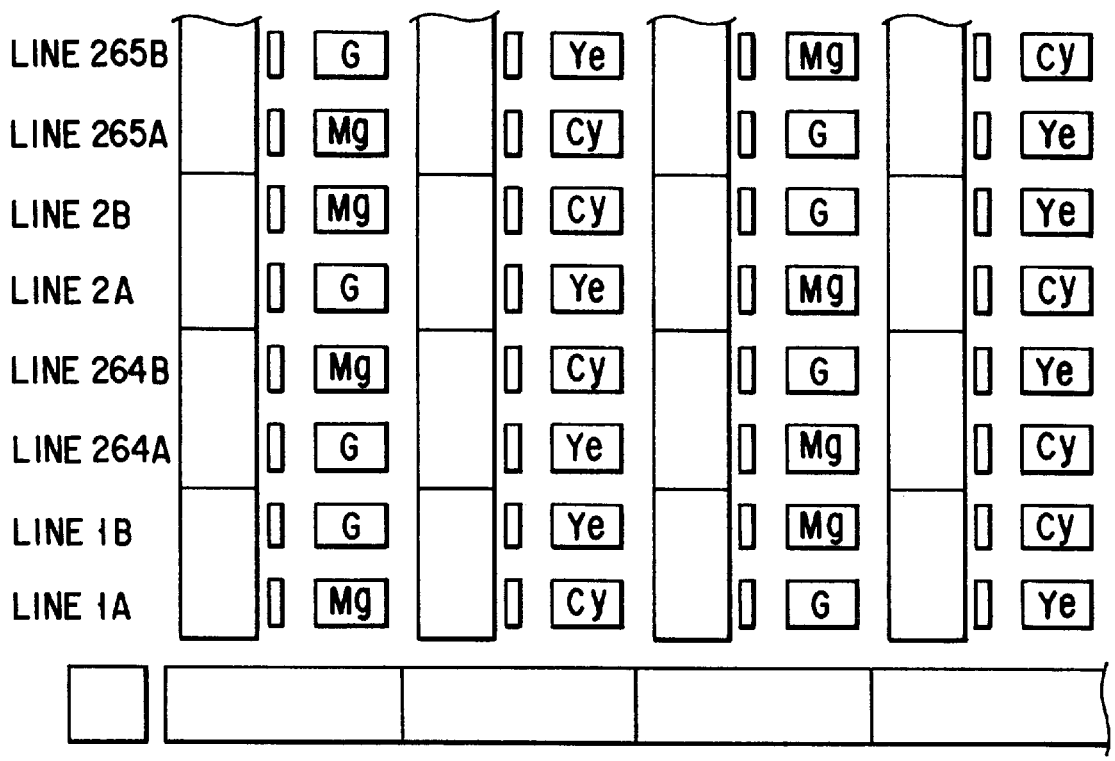
FIG. 6 is a diagram for explaining another embodiment of the present invention.

FIG. 6 shows the CCD image sensor and the arrangement of color filter elements according to another embodiment of the present invention. The CCD image sensor has, for example, 1000 pixels in the vertical direction and 800 pixels in the horizontal direction. This embodiment is different from the embodiment shown in FIG. 2 in the number of pixels in the vertical direction (twice that of the embodiment of FIG. 2) and the arrangement of the color filter element. The other portions of this embodiment are the same as those shown in FIG. 2, and detailed descriptions thereof are omitted.

The embodiment shown in FIG. 6 is driven so as to read out signal charges in the following manner. In the first frame, signal charges are successively read from line 1A, line 2A, ..., in the first field, and line 264A, line 265A, ..., in the second field. Then, in the second frame, signal charges are successively read from line 1B, line 2B, ..., in the first field, and line 264B, line 265B, ... in the second field.

The embodiment shown in FIG. 6 also has the advantage of the embodiment shown in FIG. 2. In addition, the aforementioned driving method allows repeat of the carrier wave of a modulated color signal in two frames (FIG. 5B), which is difficult to achieve by means of the CCD image sensor shown in FIG. 2. Although the lines used in the first and second frames are shifted from each other in the vertical direction by ¼ the period of adjacent scanning lines in one field, there is no problem about it in practice.

The present invention is not limited to the above embodiments, but can be modified variously without departing from the spirit and scope of the invention.

As has been described above, according to the present invention, it is possible to provide an improved solid state color image pickup apparatus which can easily convert an output from a solid state image sensor to a television signal with a simple structure, thereby facilitating the reduction of the size, weight, power consumption and cost of the image pickup apparatus.

Additional advantages and modifications will readily occur to those skilled in the art. Therefore, the invention in its broader aspects is not limited to the specific details of the representative devices shown and described herein. Accordingly, various modifications may be made without departing from the spirit or scope of the general inventive concept as defined by the appended claims and their equivalents.

What is claimed is:

1. A solid state color image pickup apparatus comprising:
    a solid state image sensor having a plurality of light receiving elements arranged in rows and columns and respectively constituting pixels; and
    a color filter having a plurality of color filter elements respectively corresponding to the light receiving elements of the solid state image sensor and arranged such that color separating characteristics are repeated according to a predetermined rule;

the color filter elements of the color filter being arranged in units of 16 pixels of four rows and four columns, so that Mg color filter elements, Cy color filter elements, G color filter elements and Ye color filter elements are repeated in this order in a horizontal direction in first and fourth rows, and G color filter elements, Ye color filter elements, Mg color filter elements and Cy color filter elements are repeated in this order in the horizontal direction in second and third rows; and the solid state image sensor being driven so as to read signal changes from odd number-th color filter elements in a first field of a frame of a television signal and from even number-th color filter elements in a second field of the frame;

when image pickup signals picked up by the light receiving elements are read from the solid state image sensor at a horizontal frequency, the color filter elements being arranged so that the color filter modulates optical information as follows:

the image pickup signal is composed of a luminance signal component and modulated color signal components, which are obtained by modulating, with first and second color-difference signals, two carrier waves having phases different from each other by $\pi/2$;

the phases of the two carrier waves are different by $\pi$ every horizontal scanning period in each field of a television signal;

the phases of the two carrier waves are reset every frame of a television signal; and the luminance signal component has a spectral characteristic substantially the same as that of a luminance signal of a standard television system, the first color-difference signal has a spectral characteristic substantially the same as that of a signal obtained by subtracting the luminance signal of the standard television system from a red signal of the standard television system, and the second color-difference signal has a spectral characteristic substantially the same as that of a signal obtained by subtracting the luminance signal of the standard television system from a blue signal of the standard television system.

2. A solid state color image pickup apparatus comprising:

a solid state image sensor having a plurality of light receiving elements, comprised of first and second groups, arranged in rows and columns and respectively constituting pixels, a plurality of vertical transfer sections, each arranged between adjacent columns of the plurality of light receiving elements, and a horizontal transfer section arranged at an end portion of the plurality of vertical transfer sections;

a color filter having a plurality of color filter elements respectively corresponding to the plurality of light receiving elements of the solid state image sensor and arranged such that color separating characteristics are repeated according to a predetermined rule; and driving means for alternately transferring signal charges of the first and second groups of the plurality of light receiving elements at a first frequency to the plurality of vertical transfer sections in units of group, transferring signal charges of the plurality of vertical transfer sections at second frequency to the horizontal transfer section in units of row, and successively reading signal charges from the horizontal transfer section, thereby obtaining an image pickup signal;

the first frequency being the same as a vertical sync signal frequency of a television signal, the second frequency being the same as a horizontal sync signal frequency of the television signal, and a transfer frequency of the horizontal transfer section being four times the frequency of the two carrier waves, and the color filter elements being arranged so that the color filter modulates optical information as follows:

the image pickup signal is composed of a luminance signal component and modulated color signal components, which are obtained by modulating, with first and second color-difference signals, two carrier waves having phases different from each other by $\pi/2$;

the phases of the two carrier waves are different by $\pi$ every horizontal scanning period in each field of a television signal;

the phases of the two carrier waves are reset every frame of a television signal; and the luminance signal component has a spectral characteristic substantially the same as that of a luminance signal of a standard television system, the first color difference signal has a spectral characteristic substantially the same as that of a signal obtained by subtracting the luminance signal of the standard television system from a red signal of the standard television system, and the second color-difference signal has a spectral characteristic substantially the same as that of a signal obtained by subtracting the luminance signal of the standard television system from a blue signal of the standard television system.

3. The solid state color image pickup apparatus according to claim 1, further comprising:

amplifier means for amplifying the image pickup signal output from the solid state image sensor; and adder means for adding to a signal output from the amplifier means a television sync signal and a color burst signal corresponding to a phase of a carrier wave of the modulation color signal component.

4. The solid state color image pickup apparatus according to claim 1, wherein the standard television system is NTSC system.

* * * * *